United States Patent [19]

Demke et al.

[11] 4,417,239
[45] Nov. 22, 1983

[54] INTERACTIVE COMBINATION DISPLAY

[75] Inventors: Kent R. Demke; Joanne L. Mumola, both of Austin, Tex.

[73] Assignee: International Business Machines Corp., Armonk, N.Y.

[21] Appl. No.: 219,668

[22] Filed: Dec. 24, 1980

[51] Int. Cl.³ .............................................. G09G 1/00
[52] U.S. Cl. ................................. 340/709; 340/721; 400/83
[58] Field of Search ............. 340/709, 731, 721, 745; 400/83

[56] References Cited

U.S. PATENT DOCUMENTS

| | | |
|---|---|---|
| 3,654,609 | 4/1972 | Bluethman et al. |
| 3,974,493 | 8/1976 | DeCavaignac et al. ............ 340/709 |
| 4,016,365 | 4/1977 | Staar ................................... 400/83 |
| 4,107,664 | 8/1978 | Marino |
| 4,121,283 | 10/1978 | Walker ............................... 340/709 |

OTHER PUBLICATIONS

*Abbreviated Character Font Display,* Bringol, IBM Tech. Discl. Bull., vol. 19, #9.
*Combination of Alphanumeric and Formatting Data on CRT Display,* Webb, IBM Tech. Discl. Bull., vol. 15, #7.
IBM Tech. Discl. Bull.; vol. 23, #8; Ringle et al.; 1/81; pp. 3794-3795; *Multi-Page Document Display.*

*Primary Examiner*—Marshall M. Curtis
*Attorney, Agent, or Firm*—Andrea P. Bryant

[57] ABSTRACT

There is disclosed a technique for displaying scrollable operating and scale lines simultaneously with an active miniature full page representation. Displayed on the operating line along with active characters is a cursor character. Displayed in the miniature full page are text indicators for representing accurately to the operator the format of the whole page of text. The miniature page is updateable upon keying. The position of the cursor within the miniature full page representation is indicated by blinking the associated character position and displaying peripheral arrows adjacent the outline of the miniature full page representation.

4 Claims, 9 Drawing Figures

4,417,239

INTERACTIVE COMBINATION DISPLAY

DESCRIPTION

CROSS-REFERENCES TO RELATED APPLICATIONS

U.S. patent application Ser. No. 219,666, filed Dec. 24, 1980, entitled "Displaying A Full Page Representation", and having K. R. Demke and J. L. Mumola as inventors.

U.S. patent application Ser. No. 219,683, filed Dec. 24, 1980, entitled "Displaying A Proportionally Outlined Miniature Page", and having K. R. Demke and J. L. Mumola as inventors.

BACKGROUND OF THE INVENTION

1. Field of the Invention

This invention relates to text editing with the aid of a CRT. More particularly it relates to a technique for supporting word processing functions and simultaneously displaying a representation of a full page of text on less than the entire screen.

2. Description of the Prior Art

In word processing systems with a display for displaying text as it is entered and edited, an operator is usually unable to display an entire page because of the size of the screen. Often times, however, seeing the entire page is desirable as it enables the operator to appreciate the proper spatial relationship of the text to the page boundaries.

One prior art technique for solving this problem is described in U.S. Pat. No. 4,168,489 wherein the actual text characters are compressed for the miniature format display. The height of each character is reduced by utilizing only certain of the rows of vertical dots. Horizontal reduction is accomplished by means of a circuit which decreases the current flowing through the horizontal winding of the cathode ray tube deflection yoke. The lessened current compresses the image width on the visual display screen. That patent also discusses other prior art techniques for reducing a page of text to fit within the confines of a partial page word processing system and points out why they are inappropriate. This reference teaches reduction of a page to about one-third its size so as to effectively fill the viewing area of the display. That is, a full page of text is displayed using characters reduced in both the horizontal and vertical dimensions of two-thirds. Not all of the compressed characters are legible. Normal word processing functions can be performed, however.

Another approach can be found in *IBM Technical Disclosure Bulletin* "Abbreviated Character Font Display", Volume 19, No. 9, February 1977, page 3248. That author discloses a techinque for displaying significant shapes of characters, words and phrases to allow an operator the ability to quickly access a particular portion of the page without actually reading displayed text.

A different approach is illustrated in *IBM Technical Disclosure Bulletin* article "Combination of Alphanumeric and Formatting Data on the CRT Display", Volume 15, No. 7, December 1972, page 2136. A single dot is used to represent each normally 5×7 dot character. In this technique, the operator can see several lines of text in normal size as well as the total unit of text as represented by dots only. The active window area of the dot only portion of the display is intensified so that the operator can perceive the format relationship of the active text to the entire text. This active window may be moved at the operator's discretion. Interactivity is not disclosed in this article. Nor is there any attempt to make the displayed test represenation proportional to hard copy page size, print pitch or orientation.

U.S. Pat. No. 4,107,664 relates to raster scanned display systems in which character size is enlarged in the horizontal dimension by increasing the number of times each dot is sequentially displayed.

OBJECTS OF THE INVENTION

It is an object of the present invention to display a representation of a full page on less than the entire screen while simultaneously supporting normal word processing functions.

It is an object of the present invention to provide an interactive mode in a word processing system to enable comprehension of format and spatial relationships while simultaneously processing text.

It is a further object of the present invention to provide the advantages of a full page size display on a 25 line×80 character display.

SUMMARY

The above and other objects and features of the present invention are accomplished by displaying a miniature representation of a full page of text on less than the entire screen while display of full size text continues. In support of normal interactive word processing functions, the full size text includes a scale line and a cursored full sized text line. The miniature page representation is comprised of 2×4 matrix character indicators for each 8×16 normal size character. Within the miniature page representation is an indicator of the cursor position corresponding to that associated with the full size line of active text. Stated differently there are two cursors displayed. The first is associated with a full size line of active text which when displayed may be less than the entire line of text. The second cursor is a position within the miniature page representation indicating exactly where the active character is with respect to the resulting output. The cursor moves along the scale line associated with the active text line as viewed by the operator during text editing. When horizontal scrolling occurs that cursor moves to the left of the screen while the cursor within the miniature page continues to indicate the position of the active text character as related to the format of the entire page.

BRIEF DESCRIPTION OF THE DRAWINGS

Other features and advantages of the present invention will become apparent from the following description taken in connection with the accompanying drawing wherein.

DESCRIPTION OF THE PREFERRED EMBODIMENT

Figure 1:
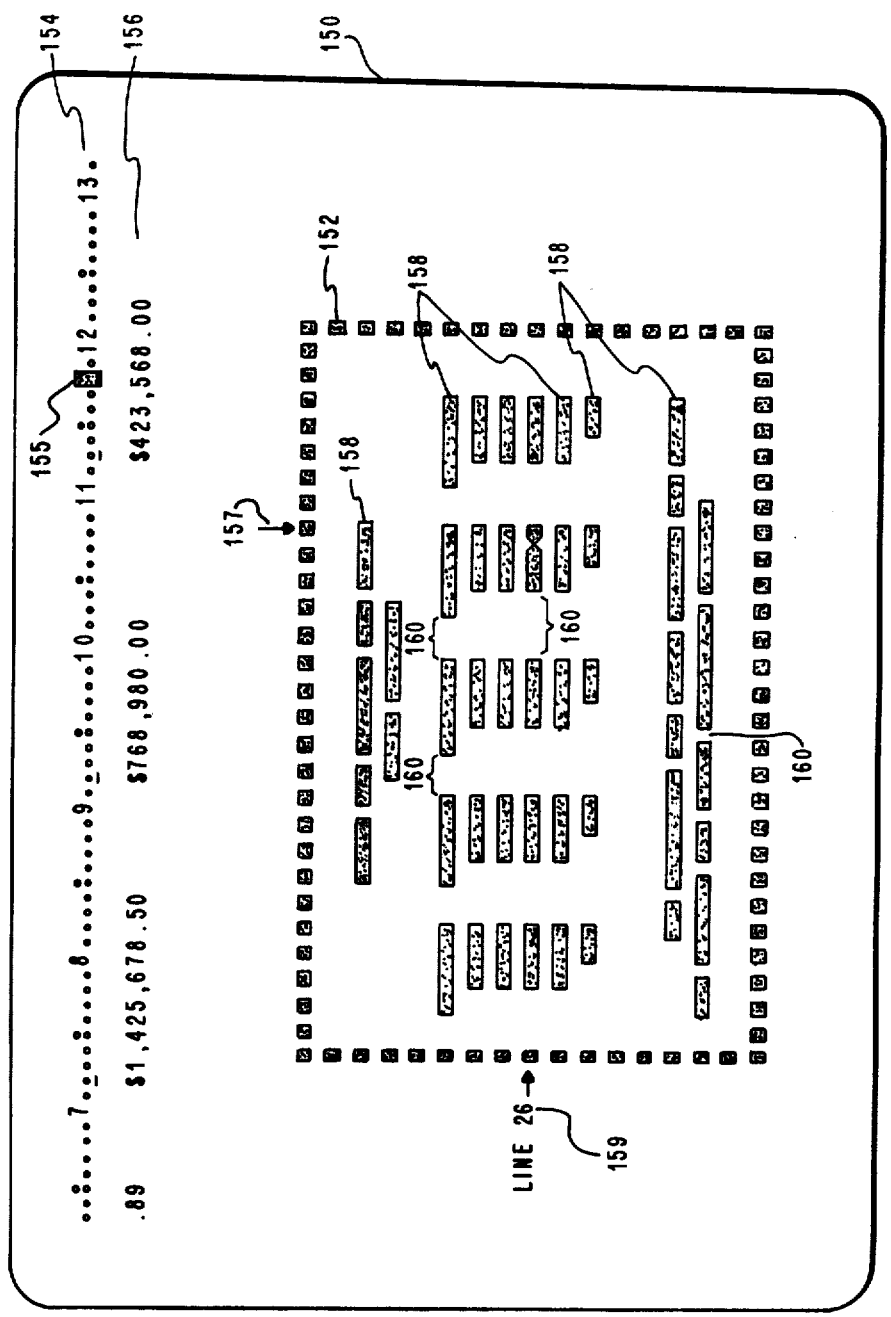
FIG. 1 is a representation of a CRT screen when the present invention is implemented.

Referring now to FIG. 1, CRT screen 150 can be seen. Indicated generally at 152 is a miniature full page representation for showing format of the active page as it is processed. The full page representation has an outline 152 which is proportional to the hard copy output which will eventually result from the word processing system's operation. The page is outlined to aid the operator in appreciating its proportionality. Part of the menu options allow the operator to choose the height and width of the output page. Straightforward logic is implemented to determine exactly where on the output screen the miniature page is to appear.

Scale line 154 shows which 80 character segment of a line of text is being processed. This may be referred to as horizontal scrolling and is old in the art as disclosed for instance in commonly assigned U.S. Pat. No. 3,654,609, Bluethman et al.

As part of the scale line there is a cursor character 155 which is directly over the character in active line 156 currently being developed. Arrow 157 points to the column of the active character and the legend Line 26 with an arrow 159 points to the row of the active character. Thus, the intersection of lines defined by arrows 157 and 159 is the point showing cursor position in the miniature full page representation. Because of the small size, this cursor position is made known to the operator by blinking that position.

Figure 2:
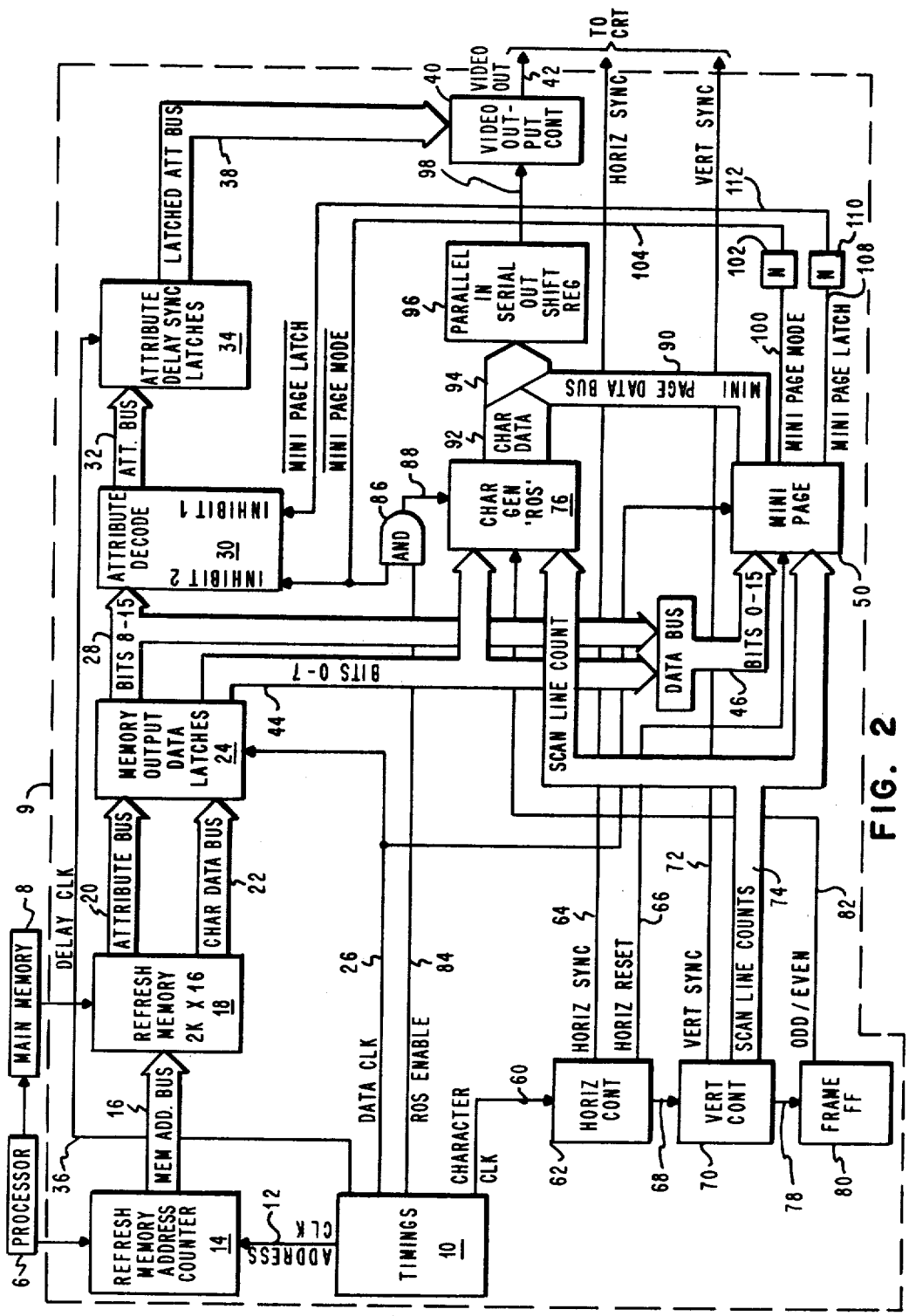
FIG. 2 is a block diagram of the system in which the present invention is implemented.

FIG. 2 is a block diagram of a typical implementation of a word processing system in which our invention is embodied. The illustrated system includes processor 6, main memory 8, a display, and display interface logic 9. Only those connections between processor 6, main memory 8 and display interface logic 9 are shown as needed for purposes of explanation of our invention. Other interconnections therebetween are conventional and well understood by those skilled in the art.

Figure 9:
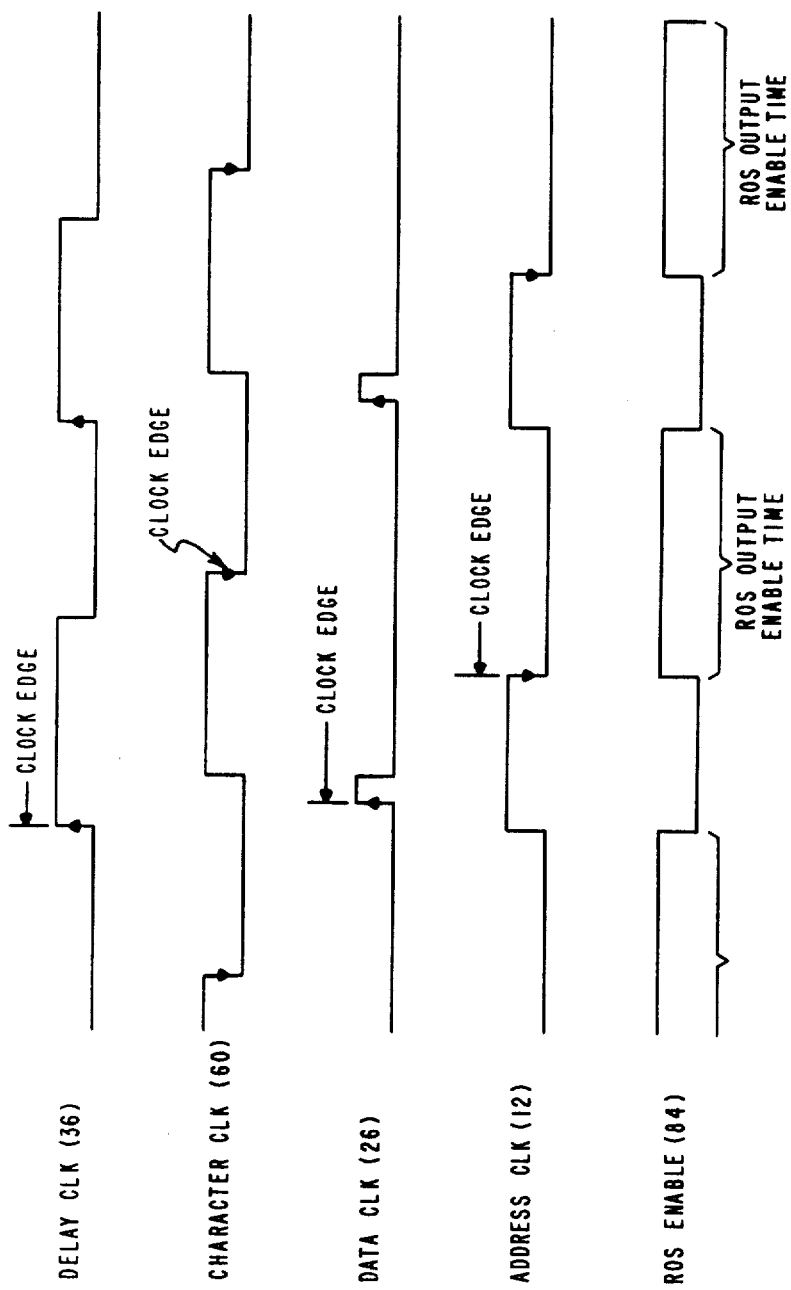
FIG. 9 shows wave forms representing the signals output by timing generator 10 in FIG. 2.

Timing generator block 10 provides various clocking signals for the word processing system illustrated. The wave forms of the signals output by timing generator 10 are illustrated in FIG. 9. The address clock signal on line 12 is input to refresh memory address counter 14 whose output appears on memory address bus 16. The address can be placed on bus 16 by processor 6 as input to the refresh memory 18. Attribute bus 20, as well as character data bus 22, are two outputs from refresh memory 18. The data on both 20 and 22 are latched into memory output data latches 24. Another clock signal from timing generator block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40, the output of which on line 42 is the video input to the CRT monitor (not shown).

The other eight bits of character data are output from memory output data latches 24 along bus 44. The total 16 bits of character information from latches 24 on the two buses 28 and 44 are joined in data bus 46 prior to being input to miniature page generator 50. Miniature page generator 50 also receives from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates counts of scan lines displayed on bus 74. Scan line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd-/even signals indicative of frame status in interlaced scanning terms and passes them along line 82 to character generator storage 76.

Character generator storage 76 also has an input from bus 44. Timing generator 10 generates the character generator storage enable signal along line 84 which is gated through AND gate 86. The signal arising in AND gate 86 passes along line 88 to character generator storage 76.

Miniature page generator 50 has three outputs. The first is the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is an input to both attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main or system memory 8 and to store "1"s for characters and "0"s for spaces in groups of 16 bits in display refresh memory 18.

Figure 3:
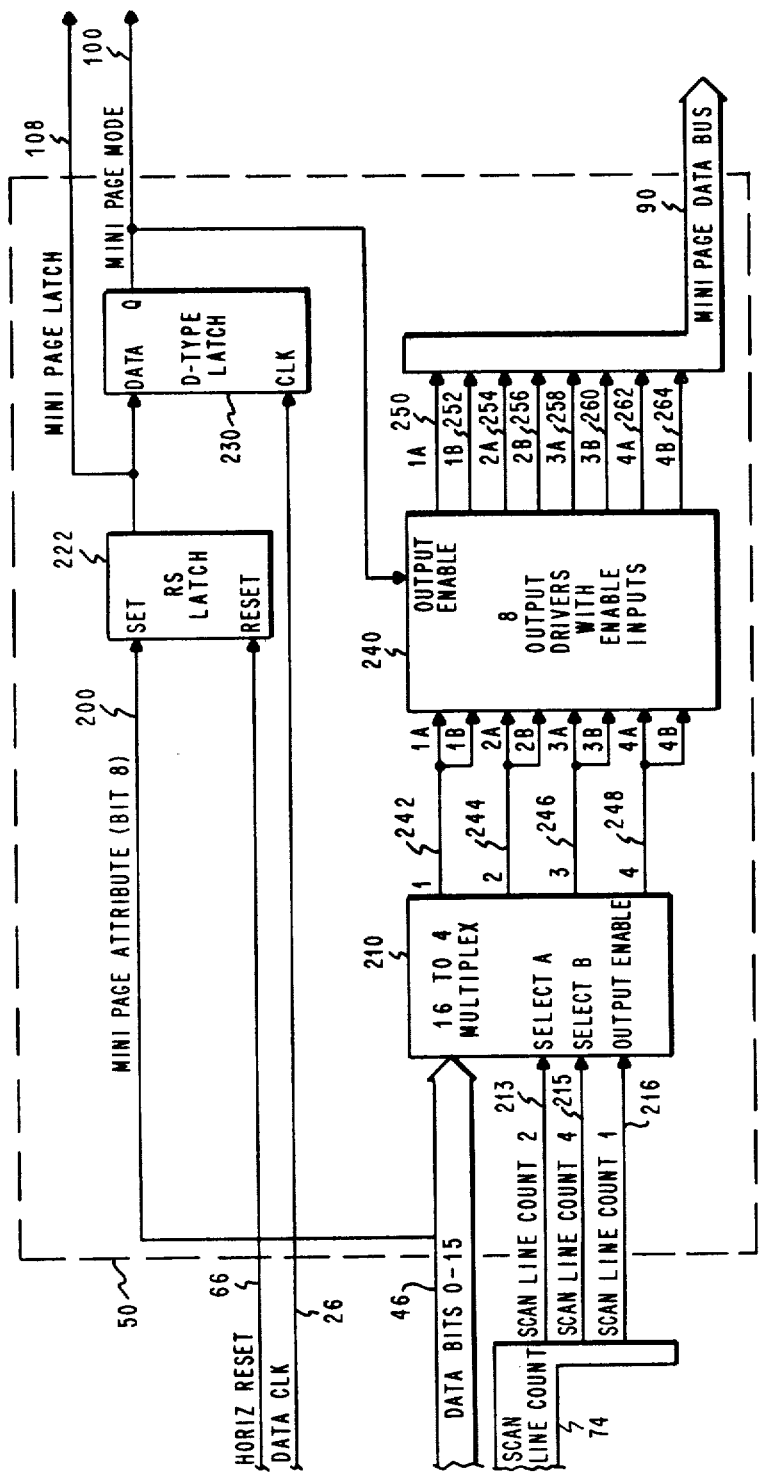
FIG. 3 is a more detailed diagram of miniature page generator 50 in FIG. 2.

Referring now to FIG. 3, internal logic of miniature page generator 50 is shown in a greater level of detail. One of 16 data bits on bus 46, bit 8, is the miniature page attribute and is placed on line 200 to set RS latch 222. The reset input for RS latch 222 is provided by horizontal reset signal on line 66. The output of RS latch 222 is the miniature page latch signal on line 108 which, as will be recalled, is inverted and then used as an inhibit input to attribute decode logic 30 of FIG. 2. Line 108 is also the data input to D Type latch 230. The clock input to latch 230 is the data clock signal on line 26. The output of D latch 230 is the miniature page mode signal on line 100 which, after inversion, is applied as the other inhibit input to attribute decode 30 of FIG. 2.

Bus 46, carrying 16 bits of data, is applied to 16 to 4 multiplexer 210. Multiplexer 210 is provided to divide the 16 data bits on bus 46 into four groups of four. Scan line counts 2 and 4 on lines 213 and 215, respectively, are taken from scan line count bus 74. Scan line count 2 provides a Select A input and scan line count 4 the Select B input to multiplexer 210. The particular four bits taken from bus 46 are a function of the states of scan line counts 2 and 4. Scan line count 1 on line 216 is the output enable signal for multiplexer 210.

Each group of four bits is broken down one bit each on lines 242, 244, 245, and 248, respectively, on output multiplexer 210. These lines, 242, 244, 246, and 248 are fanned out so that each one provides two inputs to a block of eight output drivers 240. When the miniature page mode indicator on line 100 is up, it enables output from the eight output drivers comprising block 240. The two bits derived from the one bit on line 242 are output on lines 250 and 252. Similarly, the two bits from line 244 are output on 254 and 256, the two from line 246 on lines 258, 260, and the two from line 248 on lines 262 and 264. These eight bits make one parallel word or byte of data on miniature page data bus 90 which provides an input to parallel to serial converter 96 in FIG. 2.

The serial output from shaft register 96 in FIG. 2 is provided to video output control 40 in the conventional manner for display on the CRT. Thus, the single bit stored in refresh memory 18 as a result of examining the data in the system main memory is changed to double dots in a 2×4 character box for output in the miniature page mode.

Figures 4, 5:
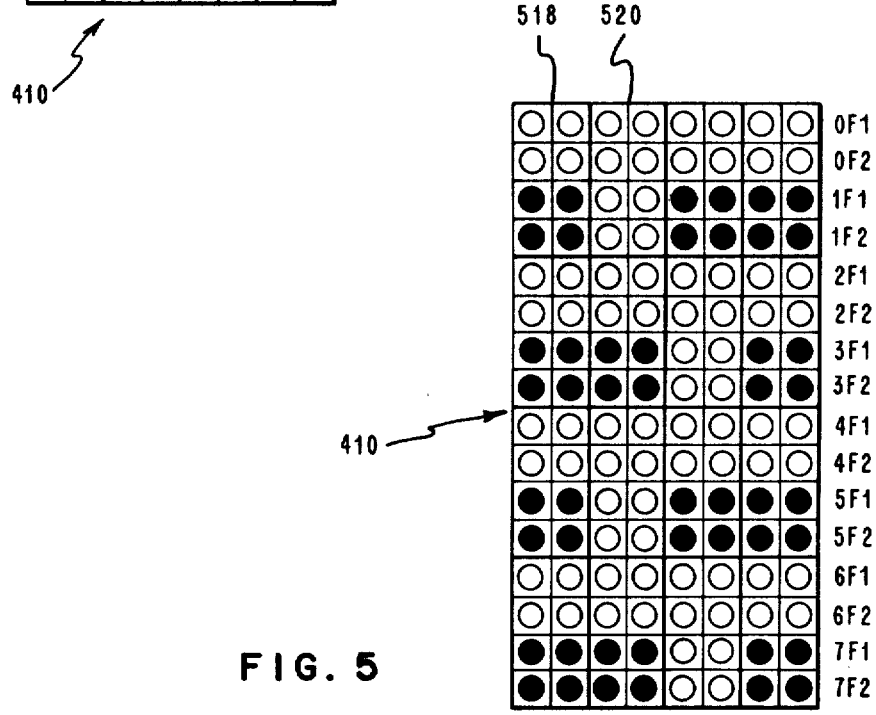
FIG. 4 is a schematic illustration of a full size character box.
FIG. 5 shows the relationship between character boxes used in the miniature display and regular size characters.

FIG. 4 is a schematic illustration of a normal size character box 410 as contemplated in the present invention. In our exemplary embodiment, this character box is 8×16, eight columns wide and 16 rows high. Rows are denoted R1 through R16; and columns, C1 through C8. A conventional CRT using interlaced scanning, as is well known in the art, can display dot matrix characters 8 dots by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

FIG. 5 shows how that same 8×16 matrix 410 can be divided into 16 2×4 miniature character representation boxes. In this manner we are able to display four characters for each of four consecutive lines in the space normally occupied on a CRT screen by a single, normal size character. It is to be especially noted that our miniature display is not a display of characters, but of character representations which enable an operator to comprehend format and spatial relationships on the page being processed.

It is our character representation structure which permits miniature page display with minimal hardware impact. The use of interlaced scanning is advantageously combined with that structure. In interlaced scanning half of the alternating horizontal lines are scanned. These may be referred to as Field 1. The other half of the horizontal lines, alternating with Field 1 lines, are then scanned. These lines are referred to as Field 2. Scan Fields 1 and 2 are interlaced. In FIG. 5 the 16 rows are designated as 0F1, 1F1, 2F1 ... 7F1 or 0F2, 1F2, 2F2 ... 7F2, where F1 and F2 indicate scan Fields 1 and 2, respectively.

We use the convention that 0 is an even number. It can be seen then that the even rows of both Fields 1 and 2 are blank, i.e., not dotted. In each of the 16 separate character representation boxes, these even rows are the topmost two rows. The bottom two rows in each box represent characters or spaces. Boxes like 518 are characters. Those like 520 are spaces.

Referring once again to FIG. 1, within miniature page representation 152 thick line segments 158 comprise a plurality of adjacent character representations 518 as shown in FIG. 5. Spaces 160 consist of space representations 520 in FIG. 5. Outline 152 is comprised of character representations and spaces to give a dotted appearance.

Figure 6:
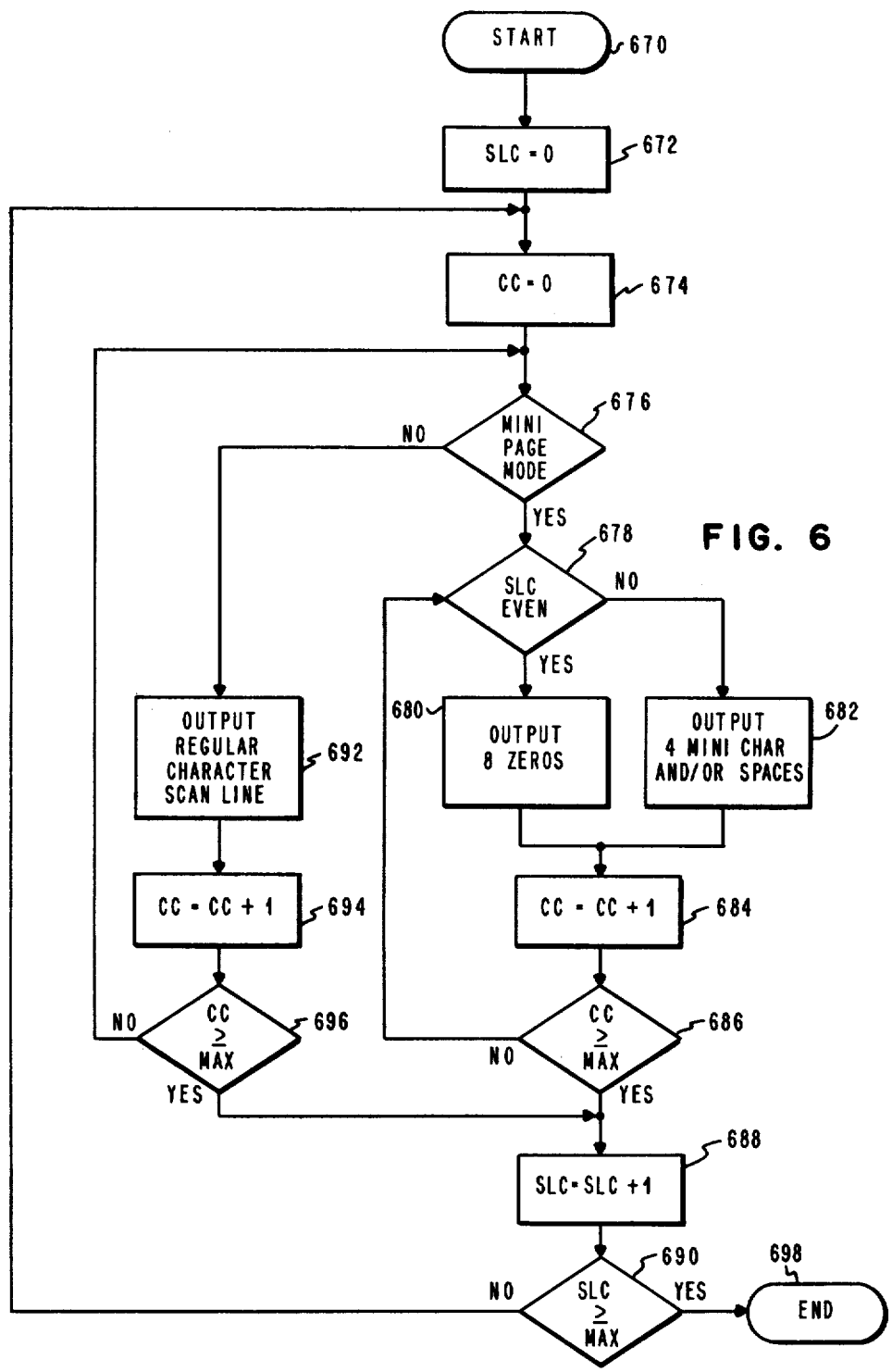
FIG. 6 is an illustration of what the hardware does to display a miniature page.

FIG. 6 is a flow chart of the interface logic for displaying on the CRT screen the line segments 158 and spaces 160 shown in FIG. 1. The process illustrated takes place in miniature page generator 50 (FIG. 2.) in time after refresh memory 18 (FIG. 2) has been loaded with 1s and 0s under control of processor 6 (FIG. 2). These indicate each character and space comprising the page to be represented on the display screen. Text data, as is well understood by those skilled in the art, is stored in the word processing system main memory 8. Access to data in main memory 8 may be performed using conventional techniques.

The process logic shown in FIG. 6 is used against the character data on bus 46 in FIG. 2. That data is entered into data latch 24 via data busses 20 and 22 from the refresh memory 18 shown in FIG. 2.

The process begins at block 670. The scan line count, SLC. is initialized to 0 at block 672. Likewise, the character count, CC, is initialized to 0 at block 674.

Next, at decision block 676 it is determined whether it is desired to output a miniature page. This determination is made by examining the attribute bit dedicated to the miniature page function. Return briefly to FIG. 3. The miniature page attribute bit is bit 8 on line 200. If a miniature page is desired, then at block 678 a determination is made whether scan line count, SLC, is even. In FIG. 2, hardware means for generating scan line count signals on bus 74 is indicated at block 70. Returning to FIG. 6, if scan line count is even, then 8 0's are output at 680 so that blanks are displayed on the screen. If scan line count is not even, that is odd, then control is passed to block 682 for outputting whatever is contained in the 4 character indicating bits taken from bus 46 in FIG. 3. If the bit in question is "1", ones are output; and if it is 0, zeros are output onto bus 90 of FIGS. 2 and 3.

Each bit, when displayed as a blank or dot, is displayed twice, that is, put twice onto bus 90 of FIG. 3. Data lines 242, 244, 246, and 248 of FIG. 3 are each input twice into block 240. This is what causes each bit to be displayed twice.

It requires four horizontal scans to form the height of a miniature character. Recall in FIG. 5 the designators 0F1 ... 7F2. The 0 through 7 portions thereof correspond to scan line count SLC. Thus, whenever SLC is even, that is, 0, 2, 4, or 6, process block 680 causes zeros to be sent to video control 40 (FIG. 2) and thereby displays blanks on the screen. Similarly, SLC is not even for designators 1, 3, 5, and 7, in FIG. 5. Thusly, a 2×4 character representation matrix is developed from a single bit on bus 46 taken from refresh memory 18 of FIG. 2.

In either event, the next step in the process is incrementing character count CC at block 684. At block 686 a comparison is made to determine the relationship of character count CC to a predetermined maximum number of characters to be represented on a line in a particular miniature page display. If character count is greater than or equal to that maximum, scan line count is incremented as shown at 688. Horizontal retrace occurs at this same time. If the character count is less than the allowable maximum, control is returned to block 678 to complete the line being displayed.

After incrementing scan line count in block 688, block 690 indicates a determination of the relationship of scan line count magnitude to a predetermined maximum. If scan line count is less than maximum at block 690, a return is made to block 674 where character count is reset to 0, and the flow begins again from there. If scan line count is greater than or equal to the predetermined maximum, the process is terminated.

If at decision block 676 it is determined that no miniature page is desired, then a normal character scan is output at block 692. Character count CC is incremented at block 694. A decision is made at block 696 whether character count CC is greater than or equal to the maximum allowed. If it is, then the scan line count is incremented at block 688, and the flow continues from there. If character count is less than the maximum, a return is made to decision block 676 to determine if a miniature page is desired. If scan line count has not reached its maximum, a return to character count initialization block 674 is made.

In our particular embodiment, scan line count may reach a maximum of 7. There are 16 horizontal scans per line of normal chracters. Having reference again to FIG. 4, a normal size character is shown in an 8×16 matrix. There are 16 rows one for each horizontal scan. It is to be remembered that we employ interlaced scanning. Therefore, 8 rows, or lines, are output when Field 1 is scanned and 8 are output when Field 2 is scanned, as earlier described with reference to FIG. 5. In each Field these rows/lines are numbered from 0 through 7. It is this line count for a given scan, and not the total number of character lines capable of appearing on the display screen, to which we refer.

Figure 7:
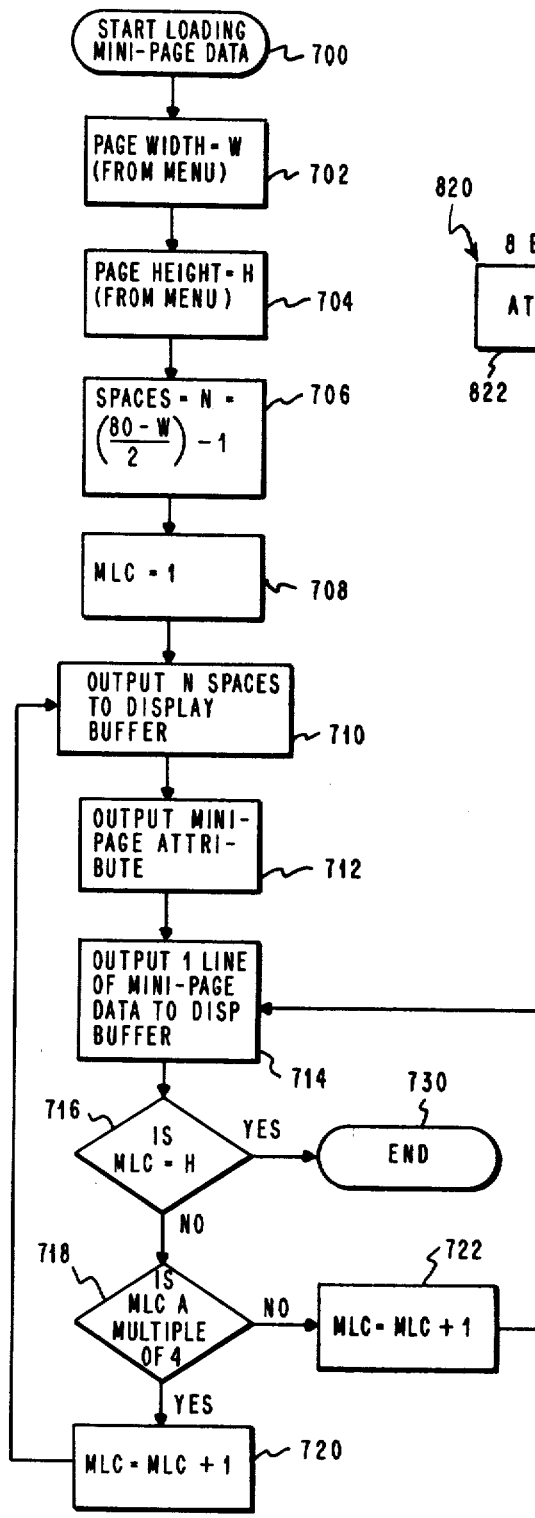
FIG. 7 illustrates what the software does to display a miniature page.

FIG. 7 describes the actions taken by processor 6 of FIG. 2 for loading refresh memory 18 with the miniature page representation to be displayed. In a conventional manner an operator of a word processing system employing our invention is presented a menu through which to choose several options. The operator is given an opportunity to let the system know what size page and in which orientation it is to be placed. In FIG. 7, a block 700 is the entry point for displaying a miniature page representation. Process block 702 represents the software retrieval of the operator indicated page width W. Likewise, block 704 represents the system retrieval of the operator designated page height H.

Process block 706 is an illustrative calculation made to determine how many spaces N remain on the display screen to the left of the page size chosen. In the particular application being described the screen width is assumed to be 80 characters wide and 25 text lines high. The miniature page is centered on the screen. Obviously, other calculations would be made to accommodate screens of different sizes, or to position the miniature page in a different place on the screen.

At block 708 the miniature page line count MLC is initialized to 1. MLC is used to count the lines of miniature text being output. Block 710 represents a software command to load the number of spaces calculated in the previous block into the refresh memory 18 in FIG. 2. It should be obvious to those skilled in the art at this point that the N spaces could be any combination of character symbols and spaces to make up N. It is in this way that we are able to display regular, full size character symbols and text to the left of a miniature page display. This can be seen with reference to FIG. 1 where there is the legend LINE 26 to the left of miniature page outline 152.

Returning now to FIG. 7, it is at block 712 that what we refer to as dynamic mode switching occurs. This will become clearer in the description accompanying FIG. 8. At this point it is sufficient to say that an indicator bit is loaded for the hardware to switch into the miniature page mode. This is more fully described in copending application "A Full Page Representation Through Dynamic Mode Switching" Ser. No. 221,671 filed Dec. 30, 1980, now U.S. Pat. 4,373,194. At process block 714 the miniature page representation character indicators for an entire line of text are loaded into refresh memory 18 in FIG. 2.

Integral with the output of lines representing text is outline 152 (FIG. 1) of the miniature page as more fully described in copending Application "Displaying An Outlined Miniature Page" Ser. No. 219,683 filed Dec. 24, 1980. Decision block 716 represents the determination of whether the number of miniature lines output, MLC, has reached the limit set by the operator indicated page height H. If not, a determination whether MLC is an integral multiple of 4 is made at 718. If so, meaning that four miniature text lines corresponding spatially to one full size text line have been loaded into refresh memory 18 of FIG. 2, MLC is incremented by one at 720 and control passes back to block 710. If MLC is not an integral multiple of 4, then MLC is likewise incremented by 1 at block 722; but control returns to block 714 to load another miniature page line into refresh memory 18. When MLC reaches the user set limit, page height H, processing ceases at terminator block 730.

Figure 8:
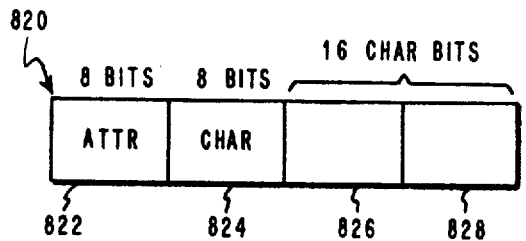
FIG. 8 shows schematically two entries in refresh memory 18 of FIG. 1.

The particular display buffer used for refresh memory 18 in FIG. 2 is organized on double byte boundaries, where each byte is eight bits long. Two bytes are used for each normal character. The leftmost 8 bits are used for attributes; the rightmost, actual character data. FIG. 8 shows two such double byte entries generally indicated at 820. The 8 bits used for attribute data are shown in byte 822, and 8 bits of character information are in byte 824. For a given output line containing miniature character indicators, however, miniature page attribute data is issued to the system only once for a line. All data thereafter is treated as miniature character representations.

A bit is reserved in the 8 bit byte usually used for attribute data, to indicate that a switch in mode from full size to miniature page is to occur. It will be recalled from the discussion of FIG. 3 that it is this bit on line 200 which in effect switches the hardware represented in FIG. 2 such that data bits on bus 44 from refresh memory 18 bypass character read only storage 76.

As descried earlier with reference to FIGS. 4 and 5, 16 miniature character representations may be indicated or stored in the space in refresh memory 18 normally occupied by the attribute and character information for a single full size character. This is indicated in 8 bit blocks 826 and 828 in FIG. 8.

Refer again to FIG. 7 where block 710 indicates the output of miniature page attribute. This function, too, may be better understood when related to FIG. 8. For instance, byte 822, the attribute byte, contains, inter alia, the proper bit to signify to the system that a miniature page line is upcoming. While a character could immediately precede miniature page data, it may be desired to have a space preceding the miniature page when displayed. Thereafter, the next 16 bits are output from miniature page generator 50 (FIG. 2) as above described, as 16 2×4 character representations. In this manner miniature page character indicators are output for the rest of that line.

During horizontal scan reset all attributes are reset. Thus, for each scan line the process of indicating to the system when it is desired to switch modes is repeated. Because the miniature page mode once indicated in the attribute is on for the rest of that scan line, no full size character data may be displayed to the right of the miniature page.

OPERATION OF THE INVENTION

When the miniature page mode is desired to be entered, as indicated to the system by a user keyboard entry, a particular bit is set in the attribute byte of the last character space before the miniature page is to be displayed. The system is structured such that when a miniature page mode is entered on a given scan line, the rest of that scan line is in miniature page format. Up to that point on the scan line, full size text may be displayed; however, it will be recalled that in this particular system a full size character is placed in an 8×16 character box and that the character construct used in the miniature page mode is a 2×4 character box. Sixteen miniature page character representation constructs fit in the space normally occupied by a full size character so that in one full size character box four characters from four text lines, which will be sequential text lines, are displayed.

When the data is examined by processor 6 in the main memory 8 of FIG. 2, one bit is stored in the refresh memory 18 for each character and a 0 for each space, a given storage location of 16 bits is arranged so that there are four groups of four bits representing four characters or spaces from four different text lines.

Referring again to FIG. 2, normal data flow when only full size text is to be displayed is from the main memory 8 to the refresh memory 18. The attribute byte on bus 20 which normally governs such things as cursor, blinking, reverse video, etc., goes to the video control 40; and the data byte on bus 22 is used to access the character generator storate 76 so that the correct code is sent over busses 92 and 94 to parallel to serial converter 96 and thence to video control 40. When in the miniature page mode, however, there is but one attribute for the remainder of the line and once that has been detected the hardware is switched so that the path of the attribute data to the video control 40 is blocked and the path of the data bus through the character generator storage 76 is blocked.

Rather, both attribute and data busses 20 and 22 are placed along one bus 46 which goes through the miniature page generator 50 and then to the parallel to serial converter 96 via busses 90 and 94 and thence to the video control 40. It will be recalled from the discussion of FIG. 3, a more detailed diagram of the miniature page generator, that the one bit stored in the refresh memory 18 for each character or space is doubled for input to output driver block 240 and thence output to the parallel data bus 90 which is serialized and sent to the video control for display on the screen.

In conclusion, we have described a technique for providing the user of a word processing system, including a relatively small 80 character wide 25 lines high display screen, the capability of displaying simultaneously, with full size character data on three sides, a miniature full page representation. That full page representation is proportional to the final hard copy output desired. The full size character data displayed above and to the left of the full page representation includes arrow indicators, the intersection of which represents the current cursor position. This position is caused to blink using conventional techniques. Character indicators which form the miniature full page representation are displayed using a combination of hardware and software. The user thus has the advantages of a full page display on a standard small size screen on which horizontal segments of the active line are displayed at the same time its relative position in the whole page is shown. All of these benefits proceed from our technique for representing an 8×16 character as a single bit in memory, but yet as a 2×4 symbol on the display.

While the invention has been particularly shown and described with reference to a preferred embodiment it will be, of course, understood by those skilled in the art that the above modification and various other changes in form and detail may be made without departing from the spirit and scope of the invention.

What is claimed is:

1. In a processor driven word processing system including a memory, a display, means for performing operations including text entry and editing on at least one line of displayed data, and means for horizontally segmenting text lines wider than the display, the improvement comprising:
   means for displaying simultaneously, with at least a portion of at least one cursored line of active text, a less than full size representation of a complete, full page of text;
   means for indicating simultaneously the corresponding location of the active line of text in said less than full size page representation; and
   wherein said means for displaying further includes means for displaying symbols indicating text character relative positions.

2. The system of claim 1 further including means for indicating within said less than full size representation the position corresponding to the cursor position within the line of active text.

3. The system of claim 2 wherein the length of the cursored line of active text displayed is less than the length of the actual text.

4. An improved method of text processing comprising the steps of:
   (1) displaying at least a portion of a cursored active line of text;
   (2) simultaneously with step (1) displaying a miniature representation of a full page of text;
   (3) displaying within said miniature page representation symbols indicating text character relative positions; and
   (4) indicating within said miniature page representation the location of the cursor within the active line of text.

* * * * *